C. B. HODGES.

Assignor of one-fourth each to H. C., C. C. & C. H. HODGES.

LUBRICATOR.

No. 10,824. Reissued Apr. 5, 1887.

WITNESSES

Jno. E. Wiles.

M. B. Dougherty.

INVENTOR

Clarence B. Hodges

By W. W. Seggers

Attorney

N. PETERS, Photo-Lithographer, Washington, D. C.

UNITED STATES PATENT OFFICE.

CLARENCE B. HODGES, OF DETROIT, MICHIGAN, ASSIGNOR OF ONE-FOURTH EACH TO HENRY C. HODGES, CHARLES C. HODGES, AND CHARLES H. HODGES, ALL OF SAME PLACE.

LUBRICATOR.

SPECIFICATION forming part of Reissued Letters Patent No. 10,824, dated April 5, 1887.

Original No. 322,291, dated July 14, 1885. Application for reissue filed January 24, 1887. Serial No. 225,379.

*To all whom it may concern:*

Be it known that I, CLARENCE B. HODGES, of the city of Detroit, county of Wayne, and State of Michigan, have invented certain new and useful Improvements in Lubricators; and I do hereby declare that the following is a full, clear, and exact description of the same.

My invention consists of the combinations of devices and appliances hereinafter specified, and more particularly pointed out in the claims.

My invention has for its object the introduction of steam and the exit of oil both through the stem at the base of the lubricator; also, in such construction as shall keep the steam and oil from commingling with each other as the steam is introduced and led up into the condenser, and permitting the two to come together only when the steam and oil are passing in the same direction toward the parts to be lubricated; also, in providing a steam-pipe or conduit which starts from the condenser, at which point it takes its steam, forming at the same time the oil-exit conduit and a communication between said pipe and the top of the visible-feed tube, whereby an equalizing-pressure is exerted back into the top of the visible-feed chamber, and through which the oil is fed to the said conduit; also, in other novel features of construction, which will be hereinafter described and claimed.

Figure 1:
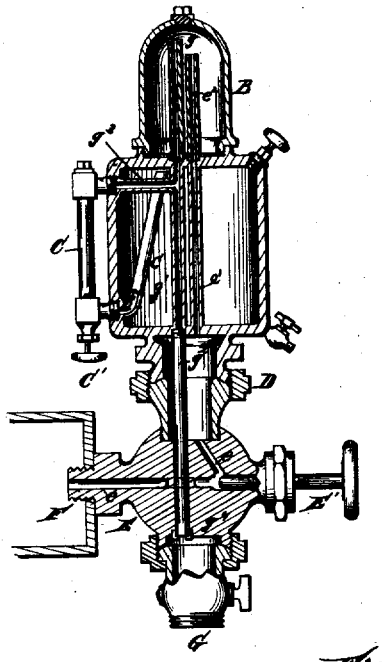
Figure 2:
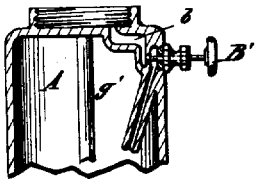
Figure 3:
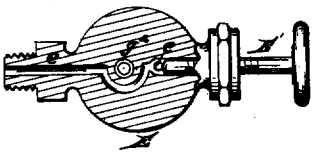

In carrying out my invention, Figure 1 is a longitudinal sectional view of a lubricator illustrating my invention. Fig. 2 is a sectional view at right angles to the former, illustrating the conduit for leading condense-water into the oil-reservoir and its valve. Fig. 3 is a horizontal section through the bracket or support.

A is an oil-reservoir; B, its condenser; C, its sight feed or tube. D is the stem. E is a bracket or support adapted for attaching it to the steam-boiler, steam-head, or other source of steam, F.

G is the oil-exit, through which oil is led to the part to be lubricated.

The bracket or support E is cored or otherwise provided with a steam-passage, *e*, which is controlled by a valve, E′. This passage leads up through the neck D, and thence, by a pipe or conduit, $e'$ and $e^2$, delivers its steam into the top of the condenser B.

*g* is a steam-equalizing pressure-pipe attached to the top of the oil-reservoir, and higher than the steam-pipe $e^2$ in the condensing-chamber, and communicates with the oil-delivery pipe $g'$ $g^2$, whereby an equalizing-pressure is exerted upon the outflowing oil.

$g^3$ is a communicating-passage, which leads from pipe $g'$ into the top of the sight-feed chamber or tube C.

*c* is an oil-pipe leading from near the top of the oil-chamber down to the bottom of the sight-feed tube.

*b* is a water-conduit leading from the bottom of the condenser B down nearly to the bottom of the oil-reservoir A, and preferably controlled by the valve B′.

The operation of the device will now be understood. Steam entering from F passes through the conduit $e$ $e'$ $e^2$ into the condenser, and on its way does not come in contact at all with the oil which is on its way to the parts to be lubricated. Free steam is therefore always provided in the top of the condensing-chamber, and the water of condensation cannot rise higher than the top of the said conduit, for thereafter it will flow back through the conduit into the steam-chamber F. This free steam in the top of the condenser, descending through the conduit *g*, exerts a back-pressure through the conduit $g^3$ into the top of the visible-feed chamber C, and so forms a substantial equilibrium within the oil-reservoir and visible-feed chamber. The conduit *g*, continuing downward below the conduit $g^3$, constitutes below this point the oil-exit passage, leading the oil to the parts to be lubricated, and keeps the same free from the incoming steam and delivers a jet of steam and oil into the oil-exit conduit G. The condense-water, passing through the conduit *b*, is regulated by the valve B′, and, passing into the oil-reservoir A, floats the oil and causes it to pass into and down through the conduit *c* into the bottom of the visible-feed chamber in the usual way.

C′ is a valve, which I prefer to locate at the base of the visible feed-chamber. The feed of the lubricator can therefore be nicely regulated either by the valve C′ or by the condense-water valve B′, or by the steam-valve E′, or by the combined adjustment of all these valves.

It will be observed that the steam in entering and the oil and steam in leaving the lubricator do not come in contact at any point. There is therefore no liability of injecting oil with the steam up into the condenser, and consequently there is no danger, by overflow-water from the condenser, of carrying oil back through the steam-supply conduit into the boiler or steam-chamber F. There is therefore produced a lubricator of very compact form, with its steam and oil conduits located within its body, and which is very certain and effectual in its operation.

The conduit $e'$ and $e^2$, as also the conduits $g$ $g'$ $g^2$ $g^3$, may be made in any convenient manner. As a measure of economy and simplicity, however, I prefer to form the parts $e'$, $g'$, $g^3$, and $b$ in the process of casting; and so, also, the conduit $c$ may be formed in like manner. The upper ends, $e^2$ and $g$, may be tubes screwed into place, and so, also, the section $g^2$ is preferably a tube screwed into place, and in this latter case I prefer to make a tight joint, $g^4$, at the lower end, so as to prevent any leakage of steam from the neck D, down through the space around the tube in the holder E, and thence into the oil-exit conduit G.

Of course it is not material that the bracket should be arranged for direct connection with the steam-chamber F, for the connection might be by an intermediate pipe.

While I purpose to employ the device in substantially the form shown in the drawings, yet it is apparent that I may lead the steam-conduit to its present point of discharge within the condenser without passing up through the body of the lubricator, it only being necessary for the proper working of the device that it should be adapted to drain back through it all condense-water rising above its point of discharge, so as to leave at all times a steam-space in the top of the condenser and extending below the upper end of the conduit $g$.

What I claim is—

1. The combination, in a lubricator in which oil is displaced from the oil-reservoir by condense-water, of a glass water-tube into the bottom of which the oil is discharged and caused to rise through the water in visible drops, an oil-exit conduit leading from the top of the said water-tube through the oil-reservoir, and another conduit connecting said oil-exit conduit with the steam-space of the condenser, substantially as described.

2. The combination, in a lubricator in which oil is displaced from the oil-reservoir by condense-water, of a glass water-tube into the bottom of which the oil is discharged and caused to rise through the water in visible drops, an oil-exit conduit leading from the top of said water-tube through the lubricator and through a stem at its base, a steam-conduit leading inward through the same stem and thence to the condenser, and another conduit within the confines of the lubricator connecting the steam-space of the condenser with the said oil-exit passage, substantially as described.

3. The combination, in a lubricator in which the oil is displaced from its reservoir by condense-water, of a glass water-tube into the bottom of which the oil is discharged and caused to rise through the water in visible drops, an oil-exit conduit leading from the top of the said water-tube and thence through the body of the lubricator and through a stem at its base, and another conduit within the confines of the lubricator connecting the oil-exit conduit with the steam-space of the condenser, substantially as described.

4. The combination, in a lubricator in which the oil is displaced from its reservoir by condense-water, of a glass water-tube into the bottom of which the oil is discharged and caused to rise through the water in visible drops, and in connection therewith two independent passages from the stem of the lubricator to the steam-space of the condenser, and an oil-exit conduit leading from the top of the said water-tube into one of said passages, whereby oil is led off to the part to be lubricated, substantially as described.

5. The combination, in a sight-feed lubricator, of, first, a steam-admission conduit leading from a steam-supply space up through the body of the lubricator to the condenser; second, an independent conduit leading from the steam-space of said condenser down through the body of the lubricator to the parts to be lubricated, and, third, a conduit leading from the top of the sight-feed chamber and discharging into said second conduit, said first and second conduits communicating with each other only above the discharge end of the third conduit, substantially as described.

6. In a sight-feed lubricator, independent steam-admission and oil-exit conduits passing through a common stem below the oil-reservoir, the latter conduit communicating with the top of the sight-feed chamber and having an extension projecting into the steam-space at the top of the condenser above the steam-pipe, the construction being such that the incoming steam and outgoing oil do not come in contact with each other, all said parts being combined substantially as described.

7. The combination, in a lubricator, of the following elements: an oil-reservoir, a sight-feed chamber, and a condenser adapted to feed the oil through the sight-feed chamber by feeding condense-water into the oil-reservoir, and in connection therewith a steam-conduit leading to a point within and near to the top of the condenser, adapted to drain back condense-water rising above its discharge end, an oil-discharge conduit leading from the discharge end of the sight-feed chamber down through the lubricator and out at its base, and a conduit communicating from the latter with the steam-space at the top of the condenser above the steam-pipe, whereby an equalizing pressure is communicated back against the outflowing oil, substantially as and for the purpose set forth.

CLARENCE B. HODGES.

Witnesses:
M. B. O'DOGHERTY,
N. S. WRIGHT.